United States Patent
Watanabe

(10) Patent No.: US 7,705,906 B2
(45) Date of Patent: Apr. 27, 2010

(54) IMAGE SENSING APPARATUS AND CONTROL METHOD THEREOF AND PROGRAM FOR IMPLEMENTING THE METHOD

(75) Inventor: Hajime Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 11/617,824

(22) Filed: Dec. 29, 2006

(65) Prior Publication Data

US 2007/0171294 A1   Jul. 26, 2007

(30) Foreign Application Priority Data

Jan. 24, 2006  (JP)  .............................. 2006-015490

(51) Int. Cl.
*H04N 5/225* (2006.01)
(52) U.S. Cl. ..................... 348/340; 348/246; 348/335
(58) Field of Classification Search ................. 348/340, 348/208.99, 335, 241, 246, 247; 396/55; 382/274, 275, 278; 358/3.26, 3.27
See application file for complete search history.

(56) References Cited

U.S. PATENT DOCUMENTS

| | | | |
|---|---|---|---|
| 6,266,054 B1 * | 7/2001 | Lawton et al. | 345/581 |
| 6,791,608 B1 | 9/2004 | Miyazawa | |
| 6,792,161 B1 * | 9/2004 | Imaizumi et al. | 382/275 |
| 6,940,550 B2 * | 9/2005 | Kitawaki et al. | 348/246 |
| 7,206,461 B2 * | 4/2007 | Steinberg et al. | 382/274 |
| 7,295,233 B2 * | 11/2007 | Steinberg et al. | 348/241 |
| 7,349,014 B2 * | 3/2008 | Higashihara | 348/241 |
| 7,446,809 B2 * | 11/2008 | Nonaka | 348/340 |
| 2002/0093577 A1 * | 7/2002 | Kitawaki et al. | 348/241 |
| 2003/0133027 A1 * | 7/2003 | Itoh | 348/246 |
| 2003/0214588 A1 * | 11/2003 | Takizawa et al. | 348/207.99 |
| 2004/0012714 A1 | 1/2004 | Kawai | |
| 2004/0227837 A1 * | 11/2004 | Ito | 348/335 |
| 2005/0068452 A1 | 3/2005 | Steinberg et al. | |
| 2006/0290795 A1 * | 12/2006 | Itoh | 348/246 |
| 2007/0030376 A1 * | 2/2007 | Kosaka | 348/335 |

FOREIGN PATENT DOCUMENTS

| | | |
|---|---|---|
| JP | 2001-159777 | 6/2001 |
| JP | 2002-204379 | 7/2002 |
| JP | 2004-172820 | 6/2004 |

OTHER PUBLICATIONS

The above reference was cited on May 16, 2008 in a Chinese Office Action issued in the counterpart Chinese Patent Application 200710002457.6, which is enclosed.

* cited by examiner

*Primary Examiner*—Tuan Ho
*Assistant Examiner*—Don Nguyen
(74) *Attorney, Agent, or Firm*—Cowan, Liebowitz & Latman, P.C.

(57) ABSTRACT

From image data for foreign substance detection obtained by an image sensing device that converts an optical image of an object into image data, correction data is created for correcting photographed image data in a case that normal image sensing is performed, and by correcting the photographed image data using the correction data, image data is obtained in which effects due to a foreign substance have been removed. In a case where a foreign substance removal operation, which removes a foreign substance affixed to an optical member, has been executed, the correction data is updated, so that correction of subsequent photographed image data using old correction data is prevented.

12 Claims, 12 Drawing Sheets

IMAGE SENSING APPARATUS AND CONTROL METHOD THEREOF AND PROGRAM FOR IMPLEMENTING THE METHOD

BACKGROUND OF THE INVENTION

1. Field of the Invention

The present invention relates to an image sensing apparatus such as a digital camera, and more specifically to an image sensing apparatus having a function to remove effects due to a foreign substance such as foreign particles or dust in an image sensing light path, and to a control method and program thereof for that image sensing apparatus.

2. Description of the Related Art

In an image sensing apparatus such as a digital camera, a foreign substance (hereinafter, abbreviated as 'dust') such as foreign particles or dust may become affixed to the surface of an optical member such as an optical filter disposed in an image sensing light path in front of an image sensor. In this case, an effect caused by the affixed dust is reflected in sensed images, decreasing the image quality. Particularly in a digital camera with a removable lens, mechanically operating portions such as a shutter and a quick return mirror are disposed near the image sensor, and dust from those operating portions may be affixed to the image sensor or the optical filter. Also, when exchanging lenses, dust may enter the camera body from the lens mount opening, causing deterioration in photographed images.

In order to address such problems, a removable-lens digital camera provided with an operating mode for removing dust affixed inside the camera has been proposed. This operating mode is, for example, referred to as a cleaning mode. When the cleaning mode is set in the camera, the camera shutter opens and the quick return mirror is raised up, and this state is maintained. In this state a user can view the image sensor or the optical filter from the lens removal/attachment opening via the shutter opening. Thus the user can perform cleaning work such as blowing off dust affixed to the image sensor or the optical filter with a blower (JP 2001-159777A (Document 1)).

Also, in JP 2002-204379A (Document 2), a technique is proposed in which by vibrating a protective glass that protects the image sensor, dust affixed to that glass is knocked off. Further, in JP 2004-172820 (Document 3), a digital camera is proposed that has a means to detect the position of dust in a sensed image, reflects the position of the detected dust in the sensed image, and corrects that portion of the image.

However, in above Documents 1 and 2, although a removal means to knock off dust affixed on the optical member is disclosed, there is no disclosure with respect to processing of dust that could not be completely knocked off. Thus, it is not possible to completely exclude the possibility that dust that could not be completely knocked off will be reflected in a sensed image. Document 3 discloses detecting a position of dust on the image sensor, and correcting the portion of a sensed image. However, there is no disclosure with respect to a means to knock dust off of the image sensor. Thus, in a case that dust increases due to continued taking of photographs, there is a risk of performing excessive image correction processing, thus diminishing the quality of sensed images.

Also, upon detecting the position of dust on the sensor element and obtaining correction data for correcting portions of a sensed image to correct photographed image data, if the dust has been removed by a dust removal unit, it becomes a problem to coordinate the dust removal operation performed by the dust removal unit with the correction data of the sensed image.

SUMMARY OF THE INVENTION

It is an object of the present invention to resolve the problems in the conventional technology described above.

The invention of the present application provides an image sensing apparatus that is capable of creating, from image data for detection of a foreign substance, correction data for correcting photographed image data obtained when normal photographing is performed, and is capable of preserving the association between the photographed image data and the correction data by updating that correction data when a foreign substance removal operation is executed; a control method for the image sensing apparatus; and a program for the control method.

According to the present invention, there is provided an image sensing apparatus, comprising:

an image sensing device configured to convert an optical image of an object into image data;

a correction data creation unit configured to create correction data for correcting photographed image data, in a case that normal image sensing is performed, from image data for foreign substance detection obtained by the image sensing device;

a foreign substance removal unit configured to remove a foreign substance affixed to an optical member disposed in an image sensing light path in front of the image sensing device and; and an updating unit configured to update the correction data, in a case where a foreign substance removal operation has been executed by the foreign substance removal unit.

According to the present invention, there is provided an image sensing apparatus, comprising:

an image sensing device configured to convert an optical image of an object into image data;

a correction data creation unit configured to create correction data for correcting photographed image data in a case that normal image sensing is performed, from image data for foreign substance detection obtained by the image sensing device;

a foreign substance removal mode for allowing a user to remove a foreign substance affixed to an optical member disposed in an image sensing light path in front of the image sensing device; and an updating unit configured to update the correction data, in a case where the foreign substance removal mode has been executed.

Further, according to the present invention, there is provided an image sensing apparatus, comprising:

an image sensing device that converts an optical image of an object into image data;

a correction data creation unit configured to create correction data for correcting photographed image data in a case that normal image sensing is performed, from image data for foreign substance detection obtained by the image sensing device;

a foreign substance removal unit configured to remove a foreign substance affixed to an optical member disposed in an image sensing light path in front of the image sensing device;

a correction unit configured to, using the correction data, correct photographed image data in a case that normal image sensing is performed; and a prohibition unit configured to prohibit execution of the correction unit, in a case where a foreign substance removal operation has been executed by the foreign substance removal unit.

Further, according to the present invention, there is provided an image sensing apparatus, comprising:

an image sensing device configured to convert an optical image of an object into image data;

a correction data creation unit configured to create correction data for correcting photographed image data in a case that normal image sensing is performed, from image data for foreign substance detection obtained by the image sensing device;

a foreign substance removal mode for allowing a user to remove a foreign substance affixed to an optical member disposed in an image sensing light path in front of the image sensing device;

a correction unit configured to, using the correction data, correct photographed image data in a case that normal image sensing is performed; and a prohibition unit configured to prohibit execution of the correction unit in a case where the foreign substance removal mode has been executed.

Further, according to the present invention, there is provided a method for controlling an image sensing apparatus, the method comprising:

a step of creating correction data for correcting photographed image data in a case that normal image sensing is performed, from image data for foreign substance detection obtained by an image sensing device that converts an optical image of an object into image data;

a removal step of removing a foreign substance affixed to an optical member disposed in an image sensing light path in front of the image sensing device; and a step of updating the correction data in a case where a foreign substance removal operation has been executed in the removal step of removing the foreign substance.

Further, according to the present invention, there is provided a method for controlling an image sensing apparatus, the method comprising:

an image sensing step of converting an optical image of an object into image data;

a creation step of creating correction data for correcting photographed image data in a case that normal image sensing is performed, from image data for foreign substance detection obtained in the image sensing step;

a step of setting a foreign substance removal mode for allowing a user to remove a foreign substance affixed to an optical member; and an updating step of updating the correction data in a case where the foreign substance removal mode has been executed.

Furthermore, according to the present invention, there is provided a method for controlling an image sensing apparatus, the method comprising:

a step of creating correction data for correcting photographed image data in a case that normal image sensing is performed, from image data for foreign substance detection obtained by an image sensing device that converts an optical image of an object into image data;

a removal step of removing a foreign substance affixed to an optical member disposed in an image sensing light path in front of the image sensing device;

a correction step of, using the correction data, correcting photographed image data in a case that normal image sensing is performed; and a step of prohibiting execution in the correction step in a case where a foreign substance removal operation has been executed in the removal step.

Furthermore, according to the present invention, there is provided a method for controlling an image sensing apparatus, the method comprising:

an image sensing step of converting an optical image of an object into image data;

a creation step of creating correction data for correcting photographed image data in a case that normal image sensing is performed, from image data for foreign substance detection obtained in the image sensing step;

a step of setting a foreign substance removal mode for allowing a user to remove a foreign substance affixed to an optical member, a correction step of, using the correction data, correcting photographed image data in a case that normal image sensing is performed; and a step of prohibiting execution in the correction step in a case where the foreign substance removal mode has been executed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

Figure 1:
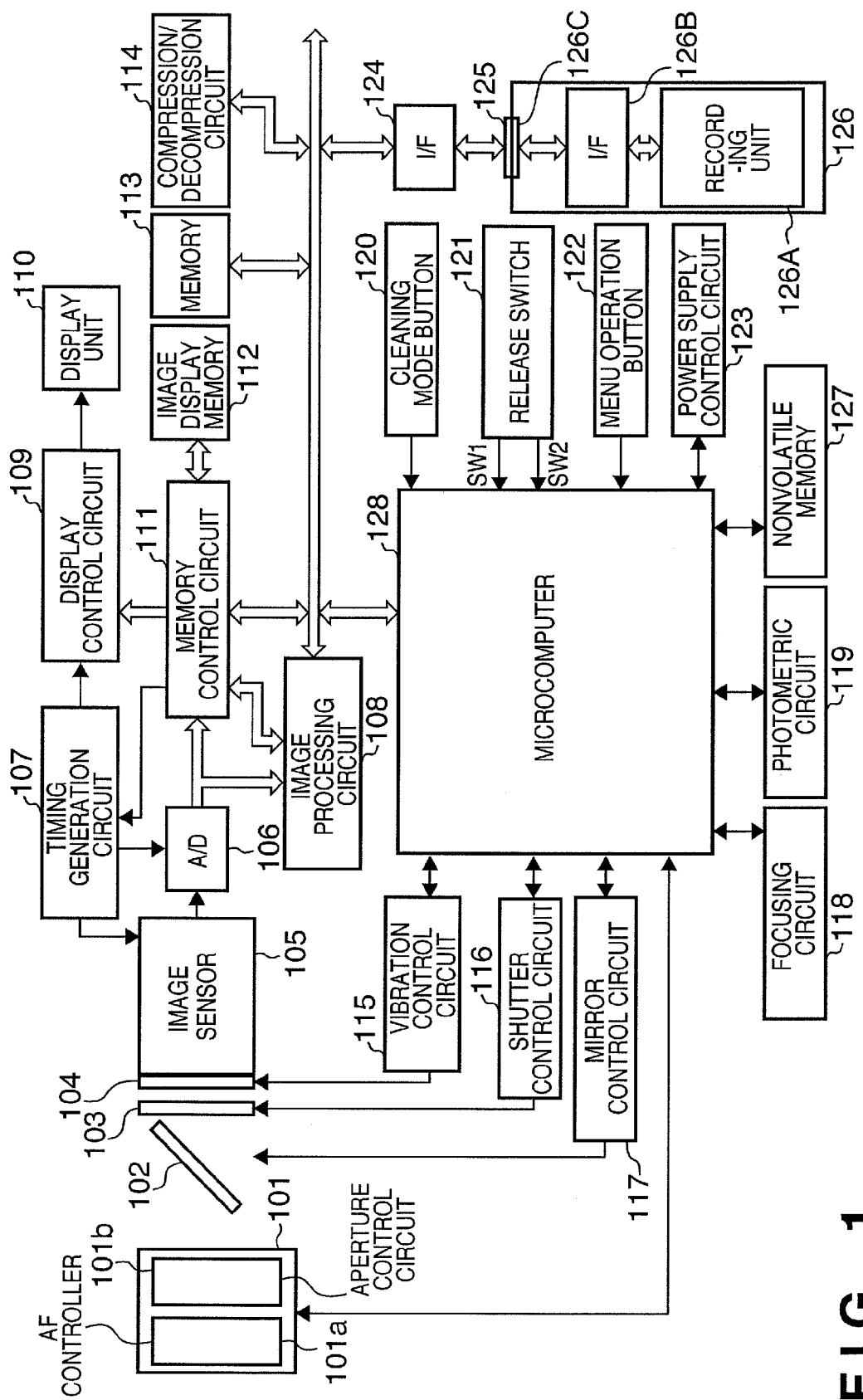
FIG. 1 is a block diagram illustrating the overall configuration of a lens exchangeable type of digital camera applied in an embodiment of the present invention.

FIG. 1 is a block diagram illustrating the overall configuration of a lens exchangeable type of digital camera applied in an embodiment of the present invention.

A lens unit 101 is an exchangeable photographic lens unit configured with a plurality of lens groups. The lens unit 101 communicates with a microcomputer 128 to control an autofocusing (AF) controller 101a in the lens unit 101, and thus focuses by moving a focusing lens within the lens unit 101. The amount of movement of the lens at this time is obtained based on the output of a focusing circuit 118. An aperture control circuit 101b is provided within the lens unit 101, and changes an optical aperture value. A quick return mirror 102 is disposed in the image sensing light path, and is movable between a position where object light from the lens unit 101 is guided to a finder optical system (not shown), and a position outside of the image sensing light path. Numeral 103 denotes a shutter, and numeral 104 denotes an optical low pass filter that is arranged in the image sensing light path and adjusts the spatial frequency of an object optical image that reaches an image sensor 105. The image sensor 105 converts the optical image to an electrical signal. The initial analog electrical signal output from the image sensor 105 is converted to a digital signal by an A/D converter 106. A timing generation circuit 107 supplies a clock signal and control signal to the image sensor 105 and the A/D converter 106, allowing them to operate.

An image processing circuit 108 performs a predetermined pixel interpolation process, developing process, or the like on digital data from the A/D converter 106, or image data from a memory control circuit 111, based on processing data added to the image data. The memory control circuit 111 controls, for example, the A/D converter 106, the timing generation circuit 107, the image processing circuit 108, a display control circuit 109, an image display memory 112, a memory 113, and a compression/decompression circuit 114.

The digital data thus output from the A/D converter 106 is written to the image processing circuit 108, the memory control circuit 111, and the image display memory 112 or the memory 113. A display unit 110 is configured with, for example, a TFT/LCD or the like. The display control circuit 109 performs control such that image data for display written to the image display memory 112 is displayed on the display unit 110. The memory 113 includes a region used as an image buffer for temporarily storing uncompressed (raw) image data that has been photographed. The memory 113 also includes a region used as a work buffer that stores processing data used in a process of developing image data in the image processing circuit 108, data used to hold calculation results of AF (Auto Focusing)/AE (Auto Exposure)/AWB (Auto White Balance), or other temporarily used data. The memory 113 also includes a region used as a file buffer that stores compressed image data compressed with a compression/decompression circuit 114. Also, the memory 113 is provided with storage capacity sufficient to store a predetermined number of still images and moving images of a predetermined period of time. Thus, even in the case of sequential image sensing, in which a plurality of still images are photographed in succession, it is possible to write a large amount of image data to the memory 113 with high speed.

The compression/decompression circuit 114 compresses or decompresses image data as JPEG data using, for example, an adaptive discrete cosine transform (ADCT). The compression/decompression circuit 114 reads image data that has been stored in the memory 113, and performs a compression process or a decompression process, and writes data for which that processing is finished to the memory 113. A vibration control circuit 115 performs control such that the optical low pass filter 104 is vibrated to shake off dust on the optical low pass filter 104. A shutter control circuit 116 controls operation of the shutter 103. A mirror control circuit 117 performs drive control such that the quick return mirror 102 is moved out of the image sensing light path. The focusing circuit 118 measures the distance from an object to be photographed. Based on the results of this measurement, the lens unit 101 is focused by the previously mentioned AF controller 101a. A photometric circuit 119 measures the luminance of the object and controls exposure based on that output. The microcomputer 128 controls operation of the digital camera configured in this manner. A nonvolatile memory 127 stores various programs executed by the microcomputer 128, such as an image sensing processing program, an image processing program, and a program that records image file data on a recording medium 126. Also stored in the nonvolatile memory 127 are various programs of an operating system or the like that realizes and executes a multi-tasking configuration of the above programs, and adjustment values and the like for performing various control.

Next is a description of operation units. Numerals 120, 121, and 122 denote operation units for inputting various operating instructions of the microcomputer 128, and these operation units are configured from various keys, buttons, and dials. Here, these operation units will be specifically described.

A cleaning mode button 120 is used to instruct a dust removal operation described below. A release switch 121 includes a switch SW1 that is switched on by pressing a release button halfway, used to instruct to start image sensing preparatory operations such as the AF (Auto Focusing) and AE (Auto Exposure) processes, and a switch SW2 that is switched on when the release switch 121 is pressed fully. When the switch SW2 is switched on, an image sensing process to write a signal read from the image sensor 105 to the memory 113 via the A/D converter 106 and the memory control circuit 111, a white balance correction process that has been set for image data using the image processing circuit 108, and a developing process are performed. Further, the instruction for operation start is given for a series of processes including reading the developed image data from the memory 113, compressing that data in the compression/decompression circuit 114, and a recording process to write the image data to the recording medium 126. A menu operation button 122 is configured with a combination of menu keys, setting keys, alphanumeric keys, and the like, not shown. The menu operation button 122 is used to make various instructions, such as changing the settings for shooting conditions or development conditions of the camera, or selection of the dust detection process, while viewing a menu displayed on the display unit 110.

Next is a description of constituent elements and accessories connected to the digital camera.

A power supply control circuit 123 is configured from a battery detection circuit (not shown), a DC-DC converter (not shown), a switch circuit (not shown) that switches a block supplied with an electric power, and the like. Here, whether or not a battery is installed, the type of battery, and the remaining battery charge are detected. Based on the results of such detection, or an instruction from the microcomputer 128, the DC-DC converter is controlled to supply the necessary voltage for the necessary period of time to each unit, including the recording medium 126. An interface 124 controls an interface (I/F) with the recording medium 126, which is a memory card, a hard disk, or the like. A connector 125 connects the recording medium 126, which is a memory card, a hard disk, or the like, to the interface 124. The recording medium 126 is a memory card, a hard disk, or the like, and is provided with a recording unit 126A configured from a semiconductor memory, a magnetic disk, or the like, an interface (I/F) 126B with the digital camera, and a connector 126C.

In the present embodiment, the interface 124 and the connector 125, which connect to the recording medium 126, are described as a single system. However, for the interface and connector to which the recording medium 126 is installed, a configuration provided with any number of systems, whether a single system or a plurality of systems, may be adopted. Also, a configuration provided with a combination of interfaces and connectors with different standards may be adopted.

The following is a description of a flowchart with respect to the operation of a digital camera configured in the manner stated above.

Figure 2:
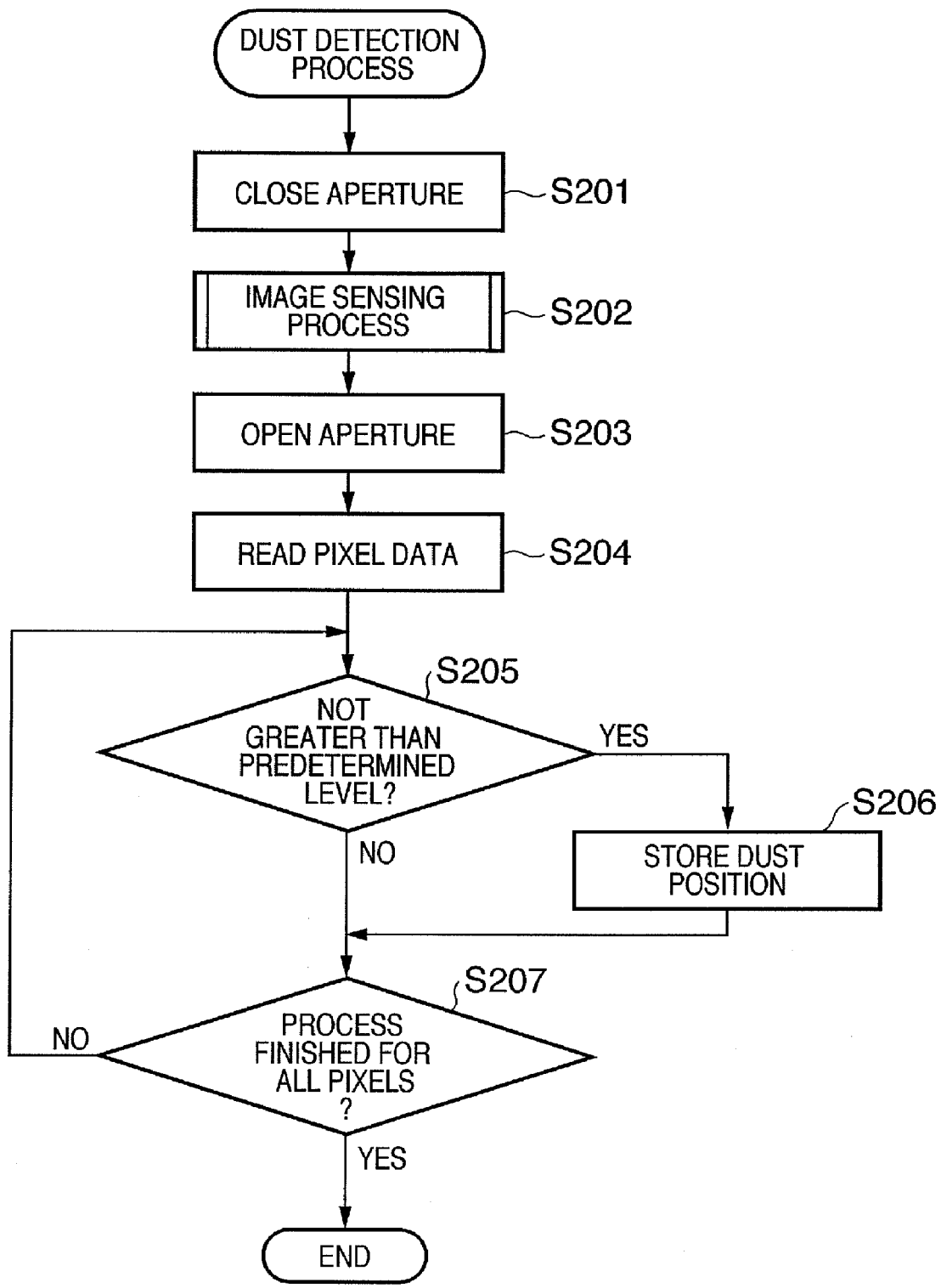
FIG. 2 is a flowchart explaining a process to detect dust in a digital camera according to the embodiment.

FIG. 2 is a flowchart explaining a process to detect dust in a digital camera according to the present embodiment. A program that executes this process is recorded onto the nonvolatile memory 127, and is executed under the control of the microcomputer 128.

This dust detection process is performed by photographing an image for dust detection. When performing this dust detection process, the camera is pointed toward a plane with uniform luminance such as the light-emitting plane of a plane light source, and preparation for dust detection is performed. In the present embodiment, a case is described in which a normal photographic lens is used, but dust detection may also be performed by providing an illumination device for illuminating the image sensor within the camera body, and illuminating the image sensor with uniform luminance. In this way, the image for dust detection in the present embodiment is an image that has uniform luminance.

The process shown in the flowchart in FIG. 2 is started by operating the menu operation button 122 to selectively give the instruction to begin the dust detection process from a menu. First, in step S201, the microcomputer 128 communicates with the lens unit 101, instructing the aperture control circuit 101b to perform aperture control to stop down the lens unit 101 to a predetermined aperture value. The aperture value set here is the minimum aperture value for dust detection. When the aperture is thus stopped down, processing advances to step S202, and the image sensing process is executed. The details of the image sensing process performed in step S202 are described below with reference to FIG. 3. The image data photographed in step S202 is temporarily stored in the memory 113. When the image sensing process is thus finished, processing advances to step S203, and the microcomputer 128 controls the aperture control circuit 101b to set the aperture of the lens unit 101 to the open value. Next processing advances to step S204, and data that corresponds to the position of each pixel of the photographed image stored in the memory 113 is read in order and supplied to the image processing circuit 108. Next, in step S205, the image processing circuit 108 compares the values of that read pixel data to a threshold value set in advance.

Here, in a case where dust affixes to the optical low pass filter 104, there is a decrease in the amount of light incident on the pixels corresponding to the position where that dust is affixed. Thus, by comparing individual pixel data to a threshold value set in advance, it is possible to detect the position of a pixel where dust is affixed, causing image defects. Thus, in step S205, when a pixel position with a pixel level not greater than the threshold value is detected, processing advances to step S206, and the pixel position is stored in the memory 113. When, in step S207, such processing for all of the pixel data finishes, all of the pixel positions where it was judged that dust is affixed have been stored in the memory 113. The pixel positions stored in the memory 113 are recorded as dust correction data in the nonvolatile memory 127. At this time, flags corresponding to the positions, each indicating whether or not correction data is present, or whether or not correction data is valid, are simultaneously set in the nonvolatile memory 127.

Next, the details of the image sensing process are described with reference to the flowchart shown in FIG. 3.

Figure 3:
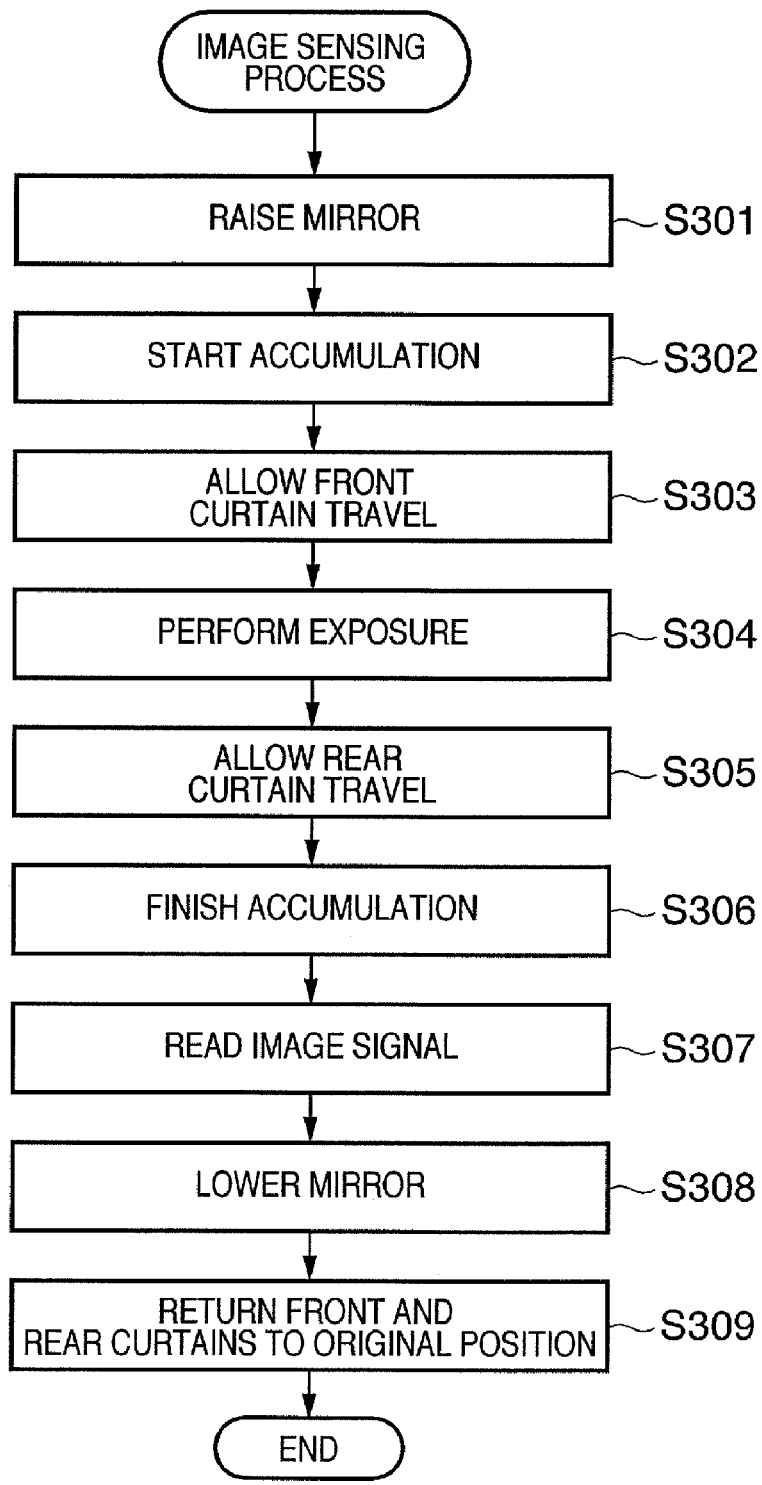
FIG. 3 is a flowchart explaining an image sensing process in the digital camera according to the embodiment.

FIG. 3 is a flowchart explaining an image sensing process (for example, step S202 in FIG. 2) in the digital camera according to the present embodiment. A program that executes this process is stored in the nonvolatile memory 127, and is executed under the control of the microcomputer 128.

When the switch SW1 is switched on, the microcomputer 128 performs auto-focusing control with the focusing circuit 118 and the AF controller 101a, thus controlling the focusing position of a focusing lens. At the same time, a photometric operation is performed using the photometric circuit 119, and a shutter value and aperture value are determined according to the photography mode that is set. When this finishes, the image sensing process routine in FIG. 3 is executed.

First, in step S301, so-called mirror-up is performed by instructing the mirror control circuit 117 to move the quick return mirror 102 out of the image sensing light path. Next, in step S302, charge accumulation in the image sensor 105 is started. Next, in step S303, the shutter control circuit 116 is instructed to allow the front curtain of the shutter 103 to travel, and in step S304 exposure is performed. Next, in step S305, the shutter control circuit 116 is instructed to allow the rear curtain of the shutter 103 to travel. Next, in step S306, the accumulation of a charge corresponding to the image signal of the object in the image sensor 105 is finished. Next, in step S307, the image signal is read from the image sensor 105, and image data processed with the A/D converter 106 and the image processing circuit 108 is temporarily stored in the memory 113. When thus reading of all of the image signal from the image sensor 105 finishes, processing advances to step S308, the quick return mirror 102 is moved down, returning into the image sensing light path. Then, in step S309, the shutter control circuit 116 is instructed to return the front and rear curtains of the shutter 103 to their original standby positions, thus finishing one iteration of the image sensing operation.

The following is a description of the dust correction process when normal image sensing is performed (the dust correction process of a normally photographed image) in the digital camera according to the present embodiment.

Now it is assumed that after a user has completed the desired image sensing preparatory operation using the menu operation button 122 or the like, the user pressed the release switch 121 to the half-pressed state (switch SW1), thus starting image sensing.

Thus the microcomputer 128 performs auto-focusing control with the focusing circuit 118 and the AF controller 101a, controlling the lens to focus at the focusing position. At the same time, a photometric operation is performed using the photometric circuit 119, and a shutter control value and aperture value are determined according to the photography mode that is set. When this finishes, the image sensing process routine in FIG. 3 is executed to perform the image sensing operation. After photographed image data photographed in this manner has been stored in an image buffer of the memory 113, the dust correction process is performed.

Figure 4:
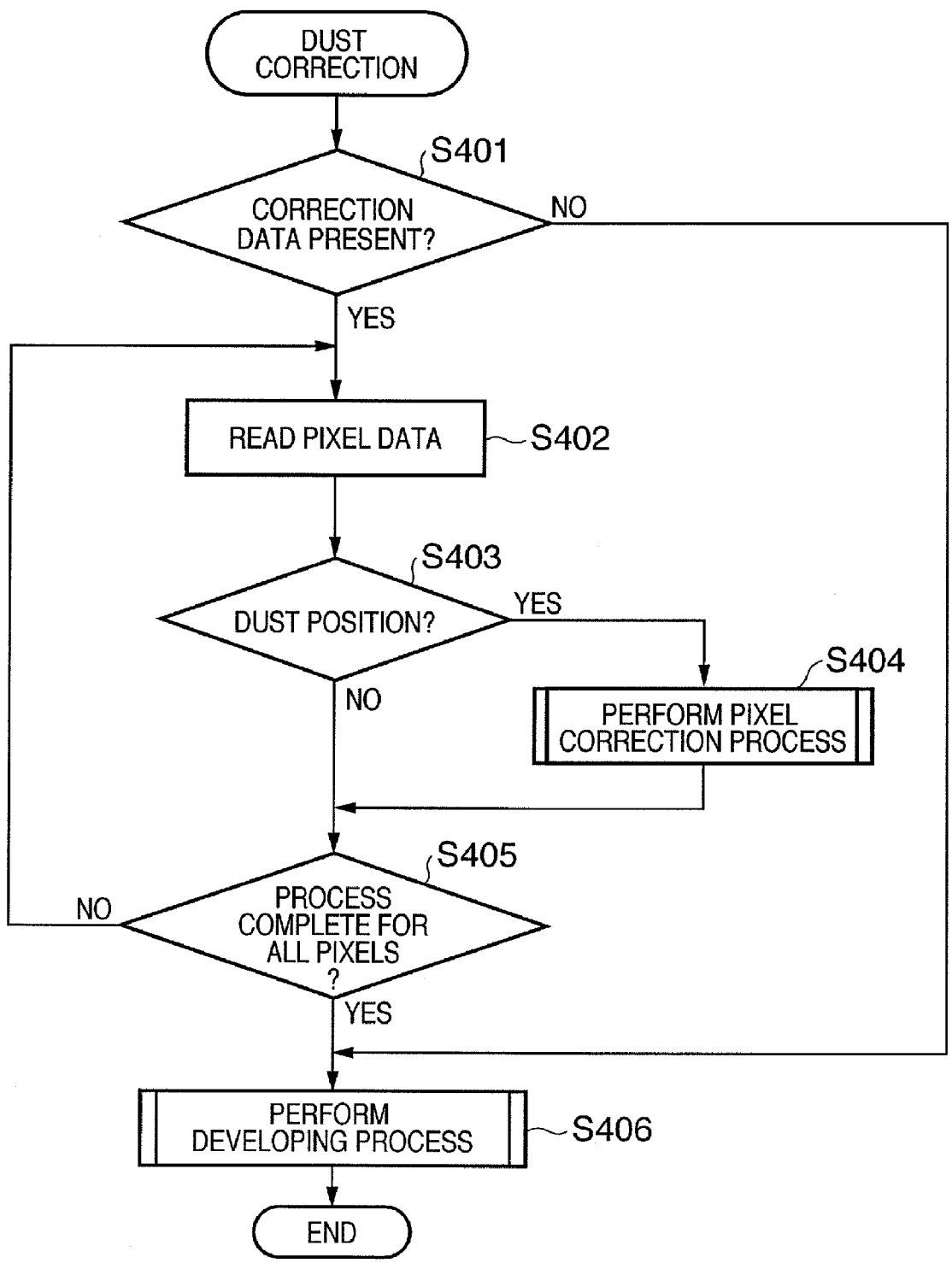
FIG. 4 is a flowchart explaining a dust correction process when normal photographing is performed in the digital camera according to a first embodiment.

FIG. 4 is a flowchart explaining the dust correction process performed for photographed image data, in a case that normal image photographing is performed in the digital camera according to the present embodiment. A program that executes this process is stored in the nonvolatile memory 127, and is executed under the control of the microcomputer 128.

First, in step S401, it is determined whether or not correction data for correcting the photographed image data is stored in the nonvolatile memory 127. Here, the determination of whether or not the correction data is stored can be performed by judging from the aforementioned flags representing whether or not the correction data is present. Also, it may be determined the presence or absence of the correction data base on whether a flag for designating the correction data is applied to a photographed image is set to valid or invalid. Upon determining that the correction data is stored, the processing advances to step S402, and data for each pixel of the photographed image data is read in order from the image buffer of the memory 113. Then, in step S403, the pixel positions of the read pixel data are compared to pixel addresses recorded in the nonvolatile memory 127 as the correction data. Here, when the addresses (positions) are the same, that pixel data corresponds to pixel positions where dust has been detected, so processing advances to step S404, the read pixel data is corrected by the image processing circuit 108, and then processing advances to step S405. Here various methods are conceivable as the correction process in step S404, but in the present embodiment, pixel data corresponding to the position of dust is obtained by performing interpolation using the values of the surrounding normal pixel data. On the other hand, in step S403, when the pixel data does not correspond to the pixel positions where dust has been detected, processing advances to step S405.

Thus in the present embodiment, a pixel correction process is executed in step S404 by the microcomputer 128, the image processing circuit 108, and the memory 113. These form a dust correction process function. Pixel data corrected in this manner is written over the original pixel data of the image buffer in step S404. Thus the dust correction process is performed in the image buffer, so that image data is stored in which effects due to dust have been removed.

In step S405, it is determined whether or not the verification and the correction process are completed for all of the pixel data of the photographed image data. Here, if it is determined that there is unprocessed pixel data, processing returns to step S402, and the above processing is performed for that unprocessed pixel data. Then, in step S405, if it is determined that all of the pixel data has been read and processed, the dust correction process for the photographed image data of one photographed image has finished. In this case processing advances to step S406, and a developing process is performed by the image processing circuit 108 for the image data stored in the memory 113. Afterward, the compression process is performed by the compression/decompression circuit 114, and the compressed data is written to the recording medium 126. Thus one iteration of the image sensing process is finished.

Next is a description of a foreign substance removal process that removes dust.

In the present embodiment, a mode for executing a process that removes dust is referred to as a cleaning mode. When the cleaning mode is executed, the microcomputer 128 instructs the vibration control circuit 115 to vibrate the optical low pass filter 104, and thus dust affixed to the surface of the optical low pass filter 104 is shaken off. Here, the timing for executing the cleaning mode is appropriately set according to the system design, but in the present embodiment, the cleaning mode is started by a user operating the cleaning mode button 120. In the present embodiment, although the optical low pass filter 104 is vibrated in the cleaning mode, the present invention is not limited to this. For examples, an optical member, such as a cover glass of the image sensor 105, an infrared cut filter and the like, may be vibrated.

Next is a description of processing in the digital camera after the cleaning mode is thus executed and the dust removal process is finished.

When the dust removal process finishes, the microcomputer 128 invalidates the correction data that was stored until then in the nonvolatile memory 127, such that the correction data is not associated with the photographed image data. For example, the correction data itself may be deleted, or without deleting the correction data itself, a valid/invalid flag may be provided in the correction data, and the association with the photographed image data determined by setting this flag on or off. When such a flag is provided, the correction data invalidity flag can be set on (or the correction data validity flag can be set off), in a case where the correction data and the photographed image data are not associated.

In a case that this sort of dust removal process is performed, there is a high possibility that the position of dust detected in the prior dust detection process will differ, and in a case where the dust position differs, erroneous dust correction will be executed if the correction data is not changed in accordance with the new dust position. Accordingly, after execution of the dust removal process, it is necessary to invalidate correction data prior to the dust removal process, which is stored in the nonvolatile memory 127, until that correction data is updated according to the latest dust removal process.

In this first embodiment, as previously stated, when the dust removal process finishes, the correction data that was stored until then in the nonvolatile memory 127 is invalidated, such that the correction data is not associated with the photographed image data. Thus, if image sensing is performed after the dust removal process, in step S401 in FIG. 4 it is determined that there is no correction data. Therefore, photographed image data photographed subsequent to the dust removal process is not corrected with the old correction data from before the dust removal process.

According to the first embodiment as described above, a digital camera can be provided with the functions that detect the position of dust affixed on an optical member, acquire correction data that corresponds to the dust position and remove the dust affixed on the optical member. By updating the correction data after dust removal has been executed by the dust removal function, it is possible to avoid correcting the photographed image data using unsuitable correction data.

Second Embodiment

Next is a description of a second embodiment of the present invention. The essential configuration of the digital camera according to the second embodiment is the same as that of the first embodiment described above, so a description thereof is omitted here. Also, the dust detection process, image sensing process, and dust correction process are the same as in the first embodiment. The distinguishing aspect of the second embodiment is the processing in the digital camera after the dust removal process has been performed.

First is a description of the process performed when the cleaning mode is executed. In the second embodiment, a case is described in which, as the dust removal function, unlike in the above first embodiment, the photographer removes the dust on the optical member using a blower or the like.

Figure 5:
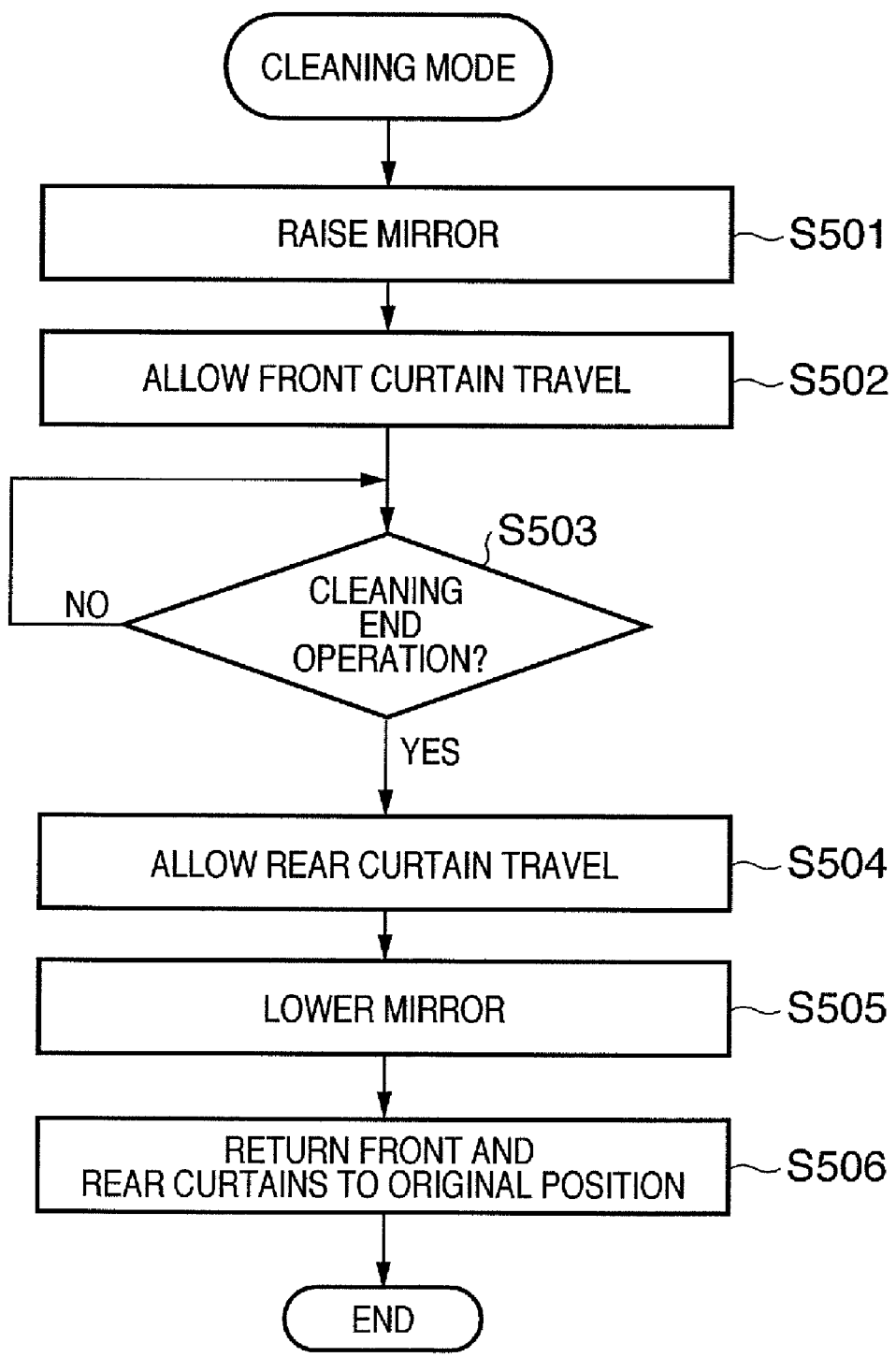
FIG. 5 is a flowchart explaining a case in which a cleaning mode has been executed in a digital camera according to a second embodiment.

FIG. 5 is a flowchart explaining a case in which a cleaning mode has been executed in the digital camera according to the second embodiment. A program that executes this process is stored in the nonvolatile memory 127, and is executed under the control of the microcomputer 128. This processing is started by a user operating the cleaning mode button 120 to designate the cleaning mode.

First, in step S501, the mirror control circuit 117 is instructed to raise the quick return mirror 102. Next, in step S502, the shutter control circuit 116 is instructed to operate the front curtain of the shutter 103, allowing the front curtain of the shutter 103 to move. At this time, this digital camera is in a state in which cleaning is possible (step S503). Here, if the lens unit 101 is installed, the user removes the lens unit 101. In this state, the user is able to view the optical low pass filter 104 via the shutter opening from an opening for attaching or removing a lens. The user, from the lens mount side, using a cleaning tool such as a blower or the like, removes dust or stains from the optical low pass filter 104, which is covered by dust-proof glass or the like. When this cleaning work is finished, the user operates the cleaning mode button 120 again to end the cleaning mode.

Thus processing advances from step S503 to step S504, and the shutter control circuit 116 is instructed to move the rear curtain of the shutter 103 to close the shutter 103. Next, in the step S505, the mirror control circuit 116 is instructed to lower the quick return mirror 102. Then, in step S506, the shutter control circuit 116 is instructed to return the front curtain and the rear curtain to their rear positions, and thus one iteration of the operation ends. After this step S506, if correction data is stored in the nonvolatile memory 127, a process may be performed to delete or invalidate that the correction data within the processing for the cleaning mode (steps S503 to S506).

Figure 6:
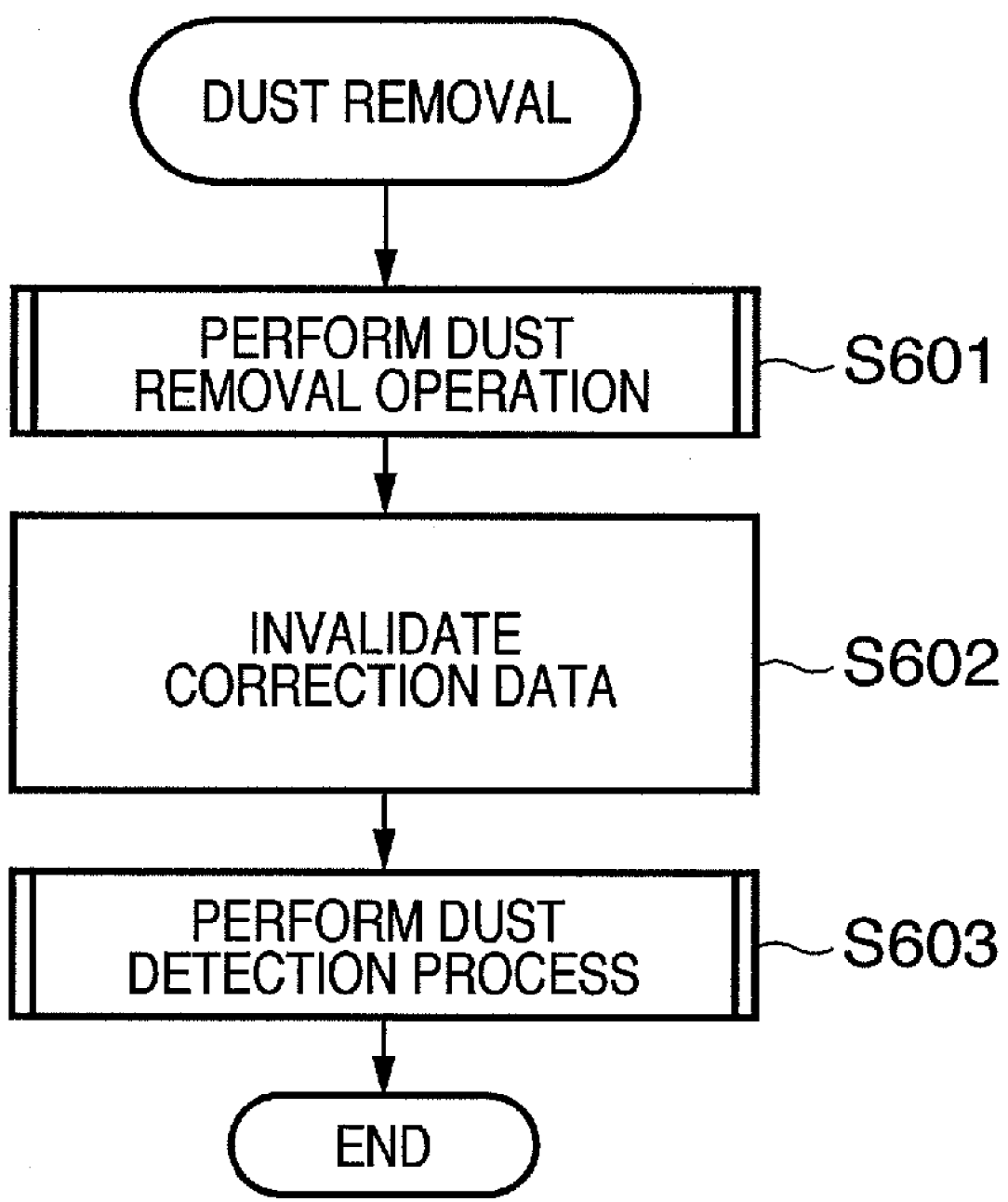
FIG. 6 is a flowchart explaining a digital camera process performed after the cleaning mode has been executed in the digital camera according to the second embodiment.

FIG. 6 is a flowchart explaining a digital camera process performed after the cleaning mode has been executed in the digital camera according to the second embodiment. A program that executes this process is stored in the nonvolatile memory 127, and is executed under the control of the microcomputer 128.

When the cleaning mode is executed in the same manner as described above, first, in step S601, the dust removal process described in the flowchart in FIG. 5 is executed. When this dust removal process is finished, the processing advances to step S602, the old correction data that was previously detected by the dust detection process and stored in the nonvolatile memory 127 is deleted or invalidated such that the old correction data is not used in subsequent image correction. Next, processing advances to step S603, and the dust detection process described in FIG. 2 is executed, thus finishing one iteration of the process. When the dust detection process in step S603 is executed, new correction data is created and recorded into the nonvolatile memory 127. Thus, when subsequent image sensing is performed, automatically, the dust correction process is executed based on the new correction data.

According to the second embodiment as described above, a digital camera can be provided with the functions that detect the position of dust affixed on an optical member, create correction data and remove the dust affixed on the optical member. When the dust removal process has been performed by the dust removal function, the old correction data is deleted or invalidated. After then the dust detection process is executed again, and the correction data is updated to the new correction data. Thus, it is possible to prevent correction of the photographed image data using the old correction data before the dust removal operation was performed.

By thus executing the dust detection process after the dust removal process, with respect to dust that could not be removed in the dust removal process, photographed image data is corrected, so it is possible to acquire photographed image data in which effects caused by dust have been eliminated. There is no limitation on the process in step S602, as long as it is a process that invalidates the correction data. For example, it is possible to delete that correction data itself, or without deleting that correction data, to provide a valid/invalid flag in the correction data, and set this flag on or off.

Modified Example of Second Embodiment

In the second embodiment described above, the dust detection process is automatically executed after executing the dust removal process, but a configuration may also be adopted in which a warning process is performed that prompts a user to execute the dust detection process using the display unit 110.

Also, in the first and second embodiments, in the dust detection process and the dust correction process, data for which the dust position has been detected is recorded in the digital camera as correction data (the dust detection process), and using the correction data, dust correction is performed within the digital camera when image sensing is performed.

However, a configuration may be adopted in which a photographed image of a plane with uniform luminance that has been sensed in the dust detection process, or dust position and size information obtained by processing that photographed image, is stored on the recording medium 126 as correction data for dust correction, and information is added for associating the correction data for the photographed image with the photographed image data obtained when normal image sensing is performed. In this case, in the dust correction process for the image data photographed with normal image sensing, a personal computer (PC) or the like imports the photographed image data and the correction data corresponding to the photographed image data, and the PC performs the correction process to remove effects caused by dust on this photographed image data. In this case, with the PC, the associated correction data is acquired from the information added to the photographed image data, and the dust correction process is performed using the acquired correction data.

Figure 7:
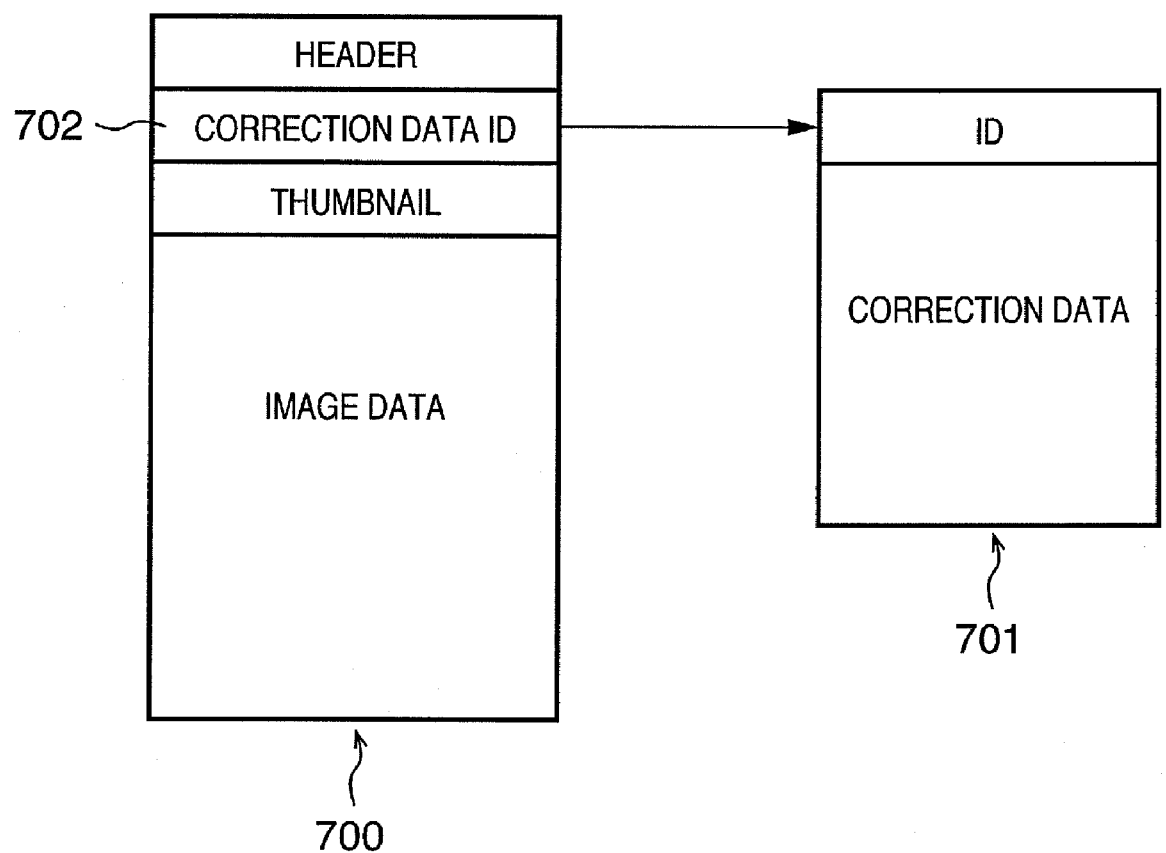
FIG. 7 depicts a view explaining the relationship between photographed image data and the correction data acquired via the flowchart in FIG. 2.

FIG. 7 is a flowchart explaining the relationship between photographed image data and correction data 701 acquired via the flowchart in FIG. 2. The photographed image data and the correction data are both recorded on the recording medium 126. This photographed image data and correction data may also be placed in the memory 113 in the stage when it is used by the microcomputer 128, such as immediately after image sensing or when the data is associated.

An image file 700 in which photographed image data is stored includes a correction data ID 702 that designates correction data 701 for correcting the photographed image data. The correction data ID 702 is data for referring to the correction data 701, which has already been obtained and is valid, at the point in time that the photographed image data is obtained. The correction data ID 702 may be data for identifying the correction data 701, or may be address data that refers to a header address of the correction data 701. Also, the correction data ID 702, when the corresponding correction data 701 is not present, indicates that the corresponding correction data is not present by storing, for example, "0" or a null code or the like.

When thus transmitting the photographed image data from the digital camera to the PC, the photographed image file 700 and the corresponding correction data 701 are transmitted to the PC. Thus dust correction can be performed by the PC.

Also, in this case, it is possible to store a plurality of image files and their corresponding correction data on the recording medium 126. Accordingly, in a case that the dust removal operation has been executed by the digital camera, it is not preferable to delete the prior correction data. In that case, after the dust removal operation has been executed, settings are set such that newly photographed image data does not refer to the stored correction data until the next dust detection process is executed.

Further, the correction data ID 702 is allowed to have, for example, information such as the date and time that the correction data was created, and is updated to the ID of the latest correction data each time the dust detection process is executed. Thus, each of a plurality of pieces of correction data may respectively be associated with each piece of photographed image data.

Further, it is possible that photographed image data from a plurality of cameras and the corresponding correction data are sent to and stored in the PC. Thus, in addition to the above date and time information, data corresponding to the maker names and identification numbers of those cameras may be included in the correction data ID 702, such that the PC can identify the correction data that corresponds to each piece of photographed image data.

Figure 8:
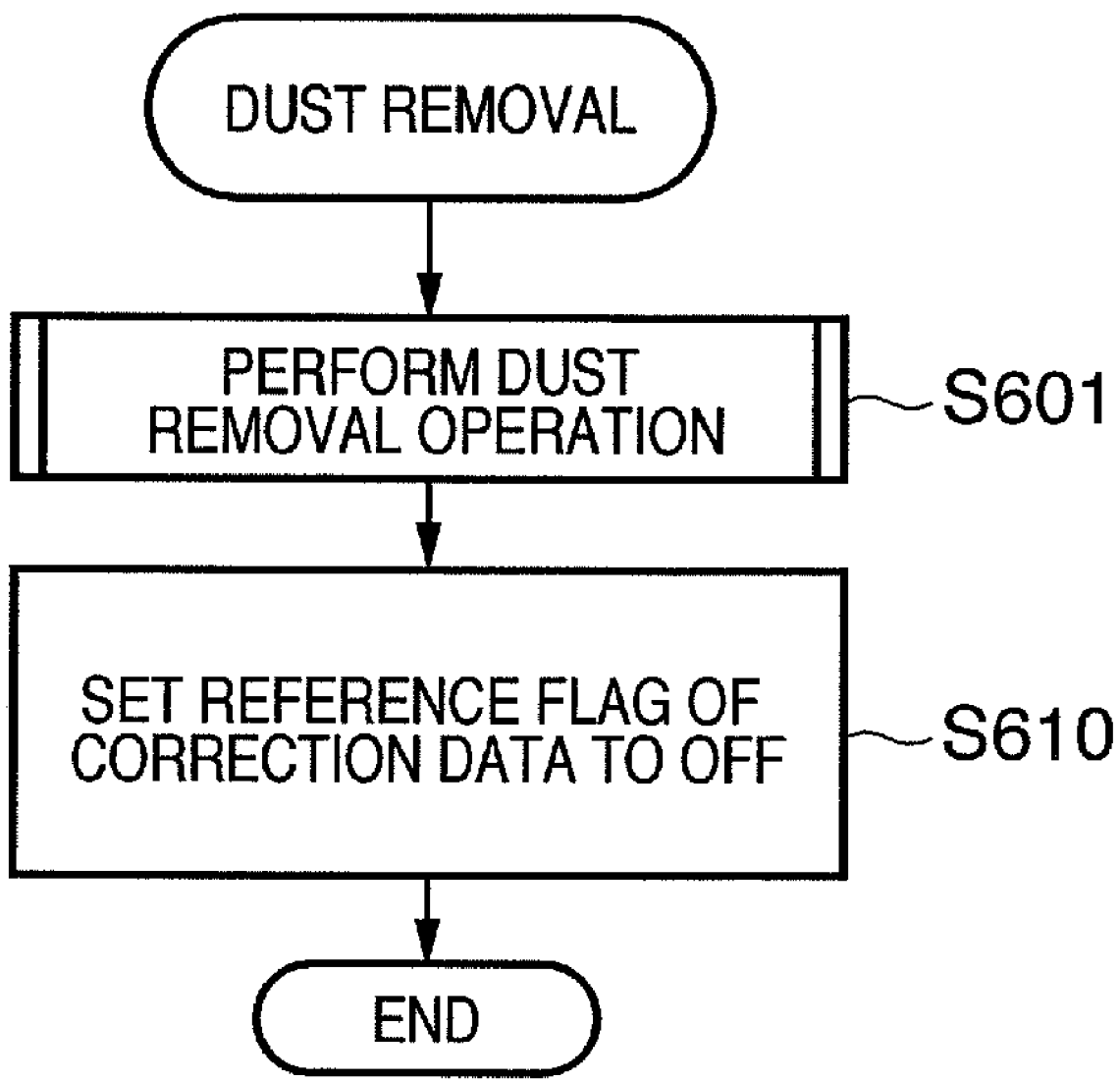
FIG. 8 is a flowchart explaining a dust removal process in a digital camera according to a modified example of the second embodiment.

FIG. 8 is a flowchart explaining the dust removal process in the digital camera according to the modified example of the second embodiment.

In step S601, when dust removal is executed in the same manner as step S601 described above, processing advances to step S610, and the correction data reference flag stored in the memory 113 is set to off (invalid). If this reference flag is off, when storing photographed image data, a valid correction data ID 702 is not added to the image file for the image data. When dust removal has been thus performed, no reference is made to prior, old correction data.

Figure 9:
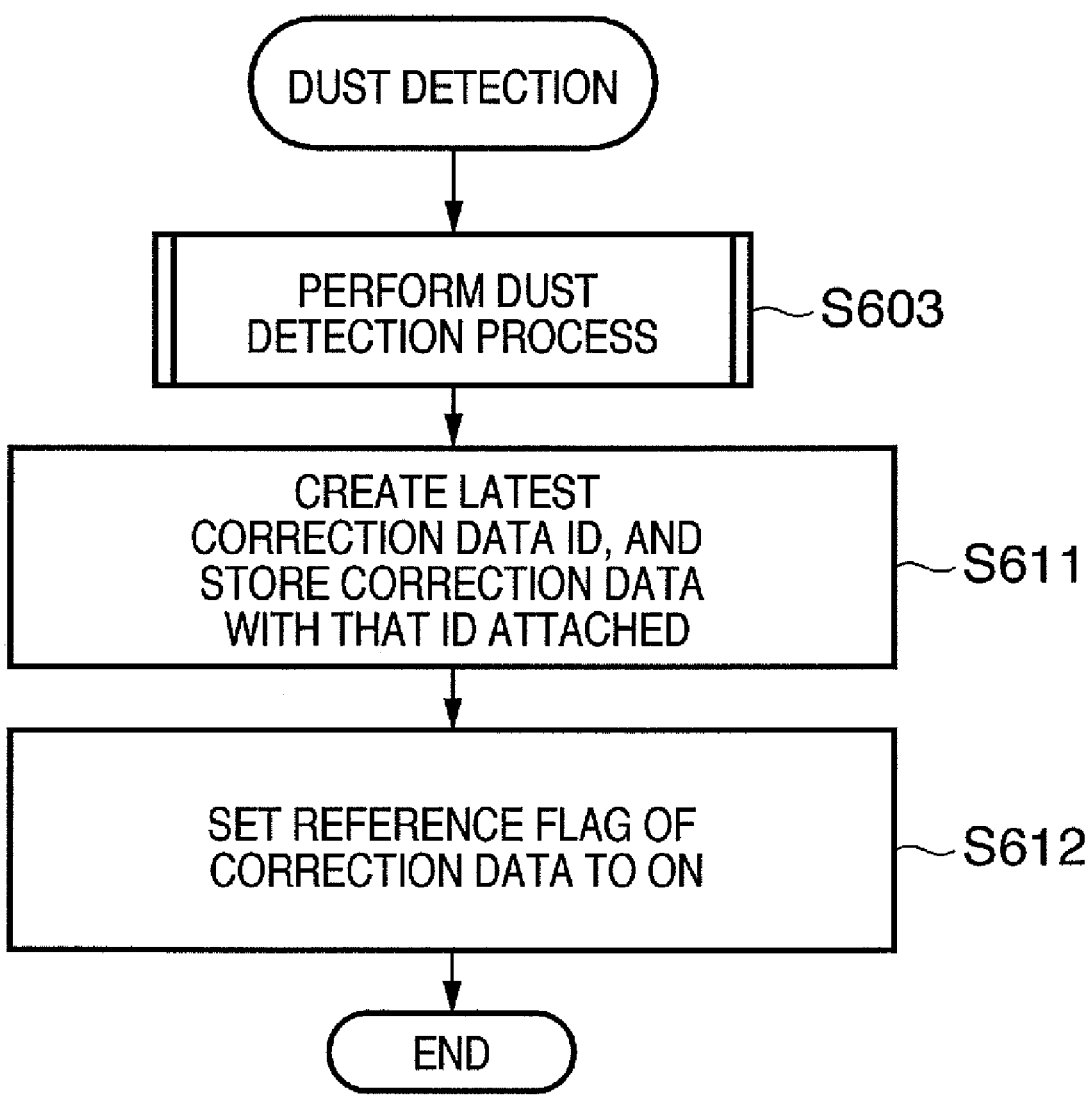
FIG. 9 is a flowchart explaining a dust detection process in a digital camera according to a modified example of the second embodiment.

FIG. 9 is a flowchart explaining the dust detection process in the digital camera according to the modified example of the second embodiment.

First, in step S603, same as in step S603 in FIG. 6 described above, the dust detection process is executed. Next, in step S611, as an ID for the correction data created by the detection process, the latest correction data ID is created and stored in the nonvolatile memory 127. Along with the latest correction data ID, the correction data created by this dust detection process is stored in the nonvolatile memory 127. Next, in step S612, the correction data reference flag described above is set to on (valid).

Figure 10:
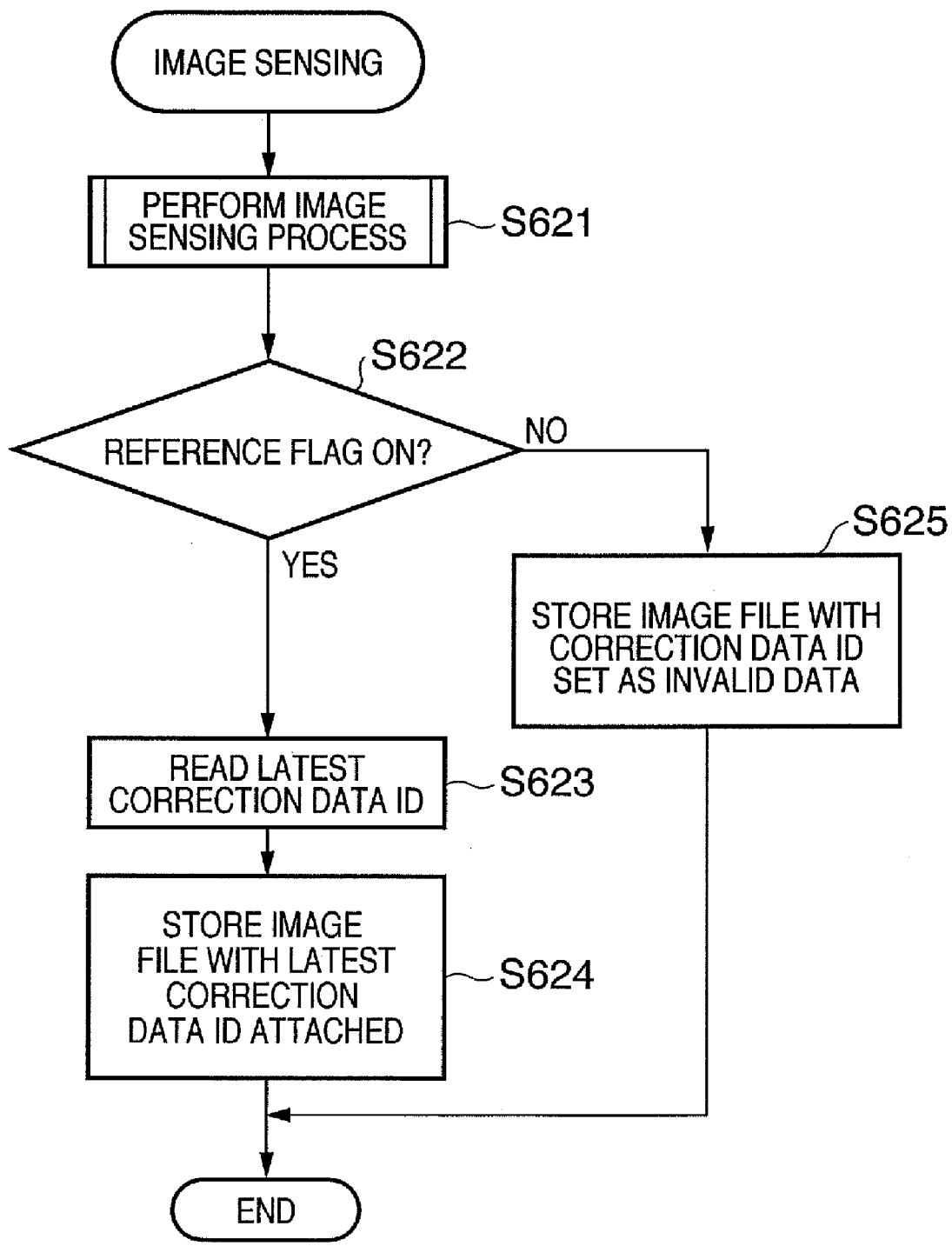
FIG. 10 is a flowchart explaining an image sensing process performed in a digital camera according to a modified example of the second embodiment.

FIG. 10 is a flowchart explaining an image sensing process performed in the digital camera according to the modified example of the second embodiment.

First, in step S621, the image sensing process is executed as described with the flowchart in FIG. 3 above. Next, in step S622, it is determined whether or not the reference flag of the correction data stored in the memory 113 is set to on. If the flag is on, the latest valid correction data is present, so processing advances to step S623, and the latest correction data ID is read from the nonvolatile memory 127. Then, in step S624, the latest correction data ID that was read is attached to the corresponding image file and stored on the recording medium 126.

On the other hand, in step S622, if the reference flag of the correction data stored in the memory 113 is off, the latest valid correction data is not present, so processing advances to step S625. In step S625, the invalid correction data ID (for example, "0" or a null code or the like) is attached to the corresponding image file and stored in the nonvolatile memory 127.

In this modified example, as in the first and second embodiments above, in a case that the digital camera has a correction function to correct photographed image data based on correction data, another process may be executed after the dust detection process has been executed in step S603 in FIG. 9. That is, uncorrected photographed image data that has been already stored is corrected using the correction data corresponding thereto, and then stored as corrected image data. Thus, it is possible to delete all correction data other than correction data created by the present dust detection process. Thus, the effective memory capacity is increased, with the result that the amount of image data that can be stored is increased.

Embodiment 3

Next is a description of a third embodiment of the present invention. The essential configuration of the digital camera according to the third embodiment is the same as that of the first embodiment described above, so a description thereof is omitted here. Also, the dust detection process, image sensing process, and dust correction process are the same as in the first embodiment, so a description thereof is omitted here.

Figure 11:
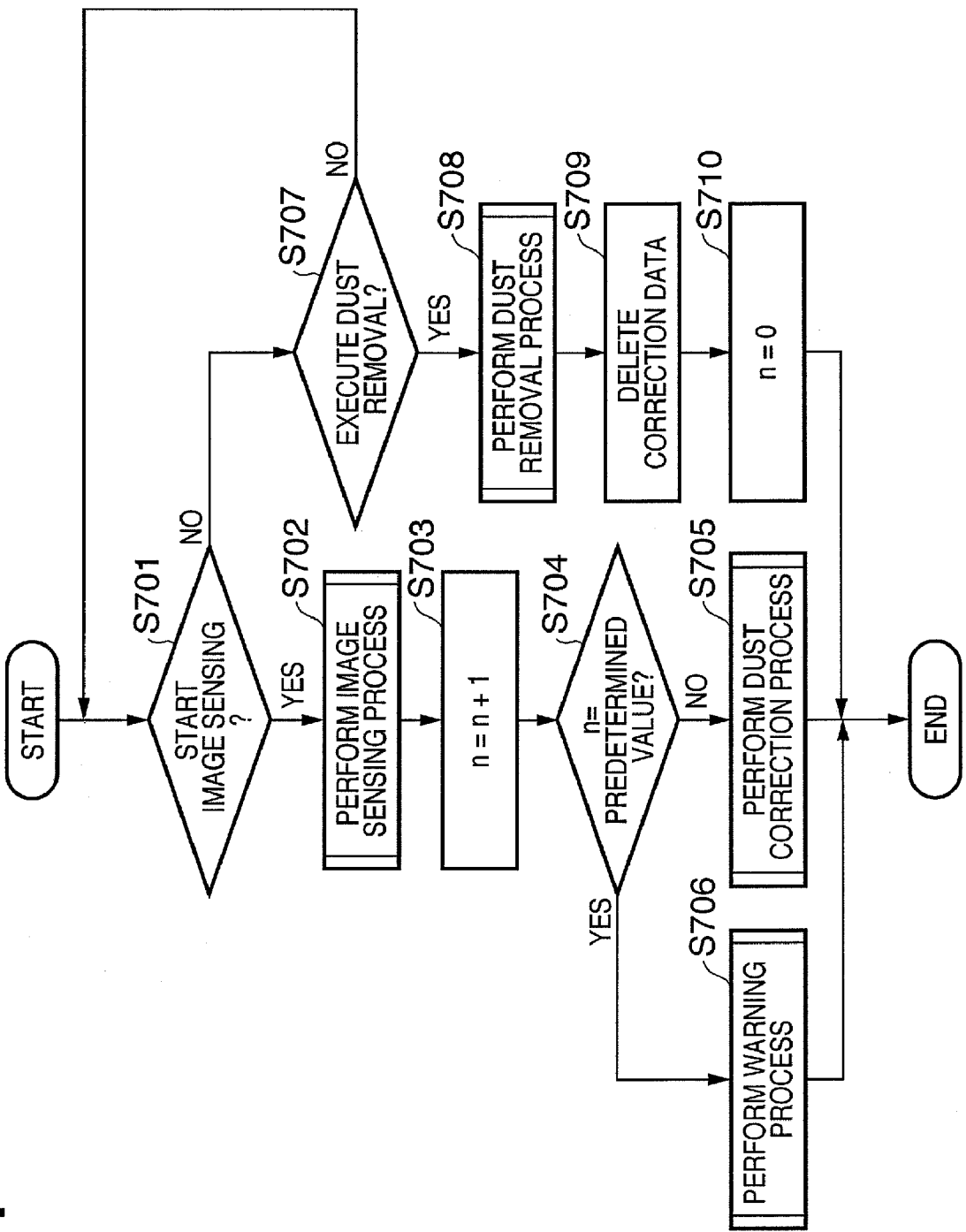
FIG. 11 is a flowchart explaining a process performed in a digital camera according to a third embodiment of the present invention.

FIG. 11 is a flowchart explaining the processing in the digital camera according to the third embodiment, and here the image sensing process and the dust removal process are particularly described. A program that executes these processes is stored in the nonvolatile memory 127, and is executed under the control of the microcomputer 128. In the third embodiment, a case is described in which the dust detection process is executed in advance.

First, in step S701, it is determined whether or not the release switch 121 has been operated give the instruction to begin the image sensing operation. If the instruction to start the image sensing has been given by the switch SW2, processing advances to step S702, and the image sensing process described in FIG. 3 is executed. Here, first, auto-focusing control is performed by the focusing circuit 118 and the AF controller 101*a* to control the focus position of the focusing lens. At the same time, a photometric operation is performed using the photometric circuit 119, and a shutter value and aperture value, which are controlled according to the photography mode that is set, are determined. When this finishes, processing advances to step S702, and the image sensing process routine is executed. Next, processing advances to step S703, a counter n that measures the number of instances of image sensing is incremented by one. The counter n is provided in the memory 113, and when the dust removal process described below is executed, the counter n is cleared to "0". Next, processing advances to step S704, and it is determined whether or not the value of the counter n has reached a predetermined value. Here, if the predetermined value has not been reached, processing advances to step S705, and the dust correction process described in FIG. 4 is executed.

On the other hand, in step S701, when it is determined that the instruction for the mage sensing process has not been given, processing advances to step S707, and it is determined whether or not the cleaning mode button 120 has been operated to give the instruction for dust removal. If it is determined that the instruction for dust removal has not been given, processing returns to step S701, and the aforementioned process is repeated. On the other hand, in step S707, if it is determined that the instruction for dust removal has been given, processing advances to step S708, and the dust removal process is executed. The dust removal process may be the method in which a user blows away dust using a blower or the like, described in above FIG. 5, or may be a method in which dust is shaken off by instructing the vibration control circuit 115 to vibrate the optical low pass filter 104. In other words, if an operation that removes dust is realized, the operation may be realized by any method. Next, processing advances to step S709, and the dust correction data stored in the nonvolatile memory 127 by the previous instance of the dust detection process is deleted or invalidated. Next, processing advances to step S710, and the value of the counter n is cleared to "0".

In step S704, if it is determined that the value of the counter n has reached the predetermined value, processing advances to step S706, and the user is warned to create dust correction data by the display unit 110. This prompts the user to perform the dust correction process, because when some amount of period of times passes after performing the dust removal process, the state of dust on the optical member changes. Thus the user can know when to perform the dust correction process.

According to the third embodiment as described above, a digital camera can be provided with the functions that detect the position of dust affixed on an optical member, correct image data corresponding to the position of the dust and remove the dust affixed on the optical member.

Further, if a predetermined number of image sensing operations have been executed since dust removal has been executed by the dust removal function, the user is informed to create dust correction data. Thus, the user can know when to perform the dust correction process. As a result, it is possible to execute the dust correction process and thus avoid a reduction in the quality of photographed images due to dust.

Also, in the third embodiment, the number of instances of image sensing is used as a standard for determining whether or not to warn the user, but the present invention is not limited to such a configuration; the number of lens changes in the case of a lens exchangeable type of digital camera, the elapsed time since executing the dust removal process, or the like may also be used.

Modified Example of Third Embodiment

Figure 12:
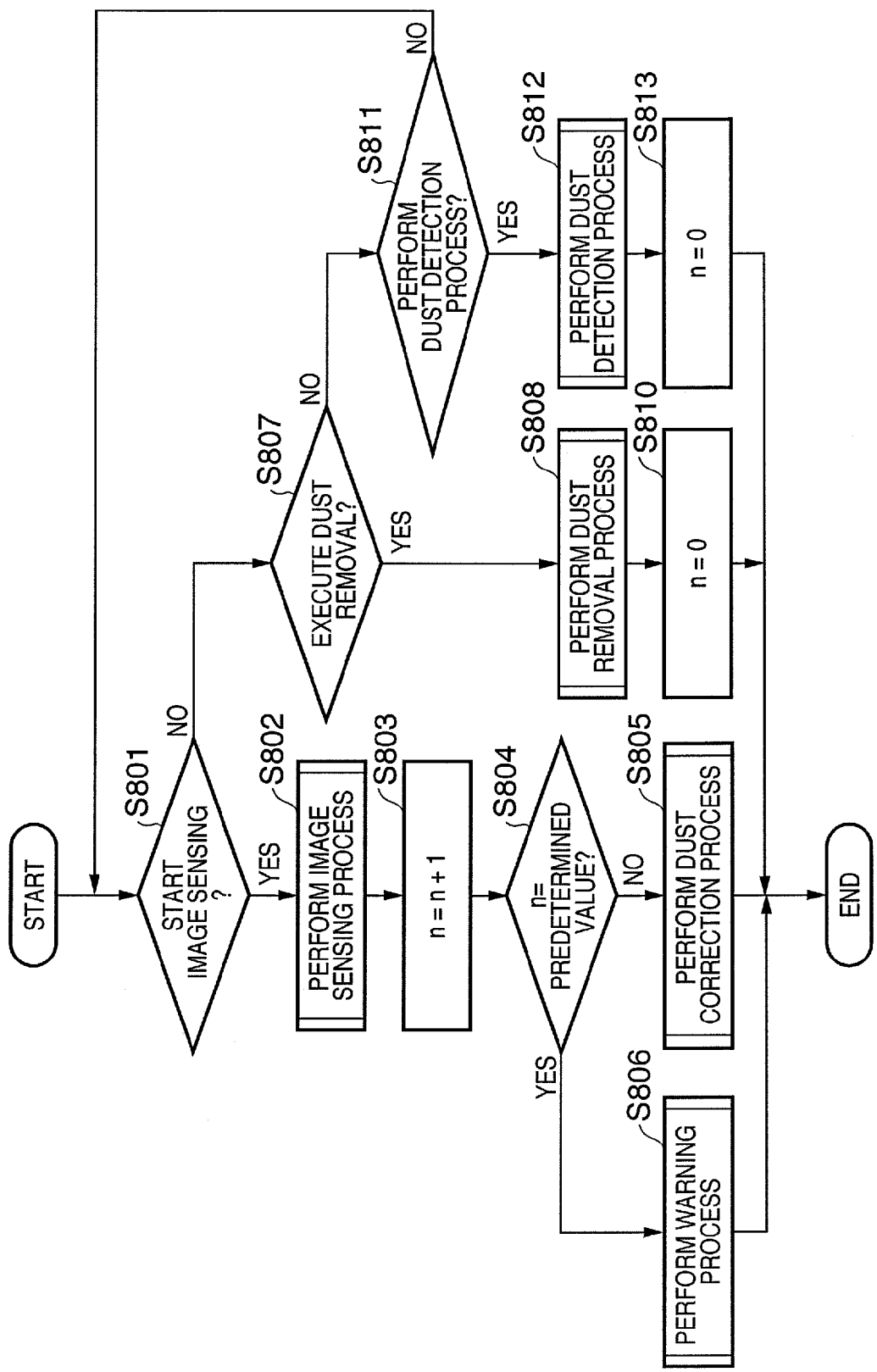
FIG. 12 is a flowchart explaining a modified example of the third embodiment of the present invention.

FIG. 12 is a flowchart explaining a modified example of the third embodiment of the present invention, and here shows an example in which a dust detection process has been added. In FIG. 12, the processing in steps S801 to S808 and step S810 is the same as the processing in steps S701 to S708 and step S710 in FIG. 11, so a description thereof is omitted here.

In step S807, it is determined whether or not the cleaning mode button 120 has been operated to instruct dust removal to begin, and if it is determined that dust removal has not been instructed to begin, processing advances to step S811, and it is determined whether or not the instruction for the dust detection process has been given. If it is determined that the instruction for the dust detection process has not been given, processing returns to step S801 and the aforementioned processing is repeated. On the other hand, if it is determined in step S811 that the instruction for the dust detection process has been given, processing advances to step S812, and the dust detection process described in FIG. 2 is executed. When this dust detection process finishes the processing advances to step S813, and the value of the aforementioned counter n is cleared to "0". That is, in this modified example, if a predetermined number of image sensing operations have been performed since the latest dust detection process was executed to create correction data, the processing advances to step S806, and the user is prompted to create correction data.

In the above manner, if a predetermined number of image sensing operations are executed after the dust detection process is executed by the dust detection function to create correction data, the user is informed to create the new correction data for the first time. Thus, the user can know when to perform the dust correction process. As a result, it is possible to execute the dust correction process and thus avoid a reduction in the quality of photographed images due to dust.

Other Embodiments

Above, embodiments of the present invention were described in detail. However, the present invention may be applied to a system configured from a plurality of devices, and it may be applied to an apparatus configured from a single device.

Also, the present invention may be achieved by directly or remotely supplying a software program that realizes the functions of the above embodiments to a system or an apparatus, and a computer of that system or apparatus reading and executing the supplied program. In that case, if the embodiment has the function of the program, it is not necessary for the embodiment to be a program.

Accordingly, in order to realize the functional processes of the present invention with a computer, a program code itself installed in the computer also realizes the present invention. That is, a computer program itself for realizing the functional processes of the present invention is also included in the claims of the present invention. In that case, any embodiment of a program having the function of a program may be used, such as a program realized by an object code and interpreter, script data supplied to an operating system, or the like.

Various items can be used as a recording medium for supplying a program. For example, a floppy (registered trademark) disk, hard disk, optical disk, magnetic optical disk, MO, CD-ROM, CD-R, CD-RW, magnetic tape, nonvolatile memory card, ROM, DVD (DVD-RON, DVD-R), or the like may be used.

As another method of supplying a program, it is possible to supply the program by using a browser of a client computer to connect to an internet home page, and download from the home page to a recording medium such as a hard disk. In that case, the item downloaded may be the computer program itself of the present invention, or may be a compressed file that includes an automatic installation function. Also, supply of the program is realizable by dividing the program codes that constitute the program of the present invention among a plurality of files, and downloading each file from a different home page. That is, the claims of the present invention also include a WWW server allowing a plurality of users to download a program file for realizing the functional processes of the present invention with a computer.

An embodiment may also be adopted in which the program of the present invention is encrypted, stored on a storage medium such as a CD-ROM, and distributed to a user. In this case, a user who has cleared a predetermined condition is allowed to download key information to decrypt the encryption from a home page via the internet, and by using that key information, the encrypted program is installed in a computer in an executable format.

The present invention can also be realized with an embodiment other than one in which the functions of the embodiments described above are realized by a computer executing a program that has been read. For example, based on the instructions of that program, an operating system or the like operating on a computer, performs all or part of the actual processes, and the functions of the embodiments described above can be realized also by those processes.

Further, the program read from the recording medium may be written to a memory provided in a function expansion port inserted into the computer or a function expansion unit connected to the computer. In this case, after the program is written to the memory, based on the instructions of that program, a CPU or the like provided in that function expansion port or function expansion unit performs all or part of the actual processes, and the functions of the embodiments described above are realized by those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-015490, filed Jan. 24, 2006, which is hereby incorporated by reference herein in its entirety.

What is claimed is:

1. An image sensing apparatus, comprising:
   an image sensing device configured to sense an object and generate photographed image data of the object;
   a correction data creation unit configured to create correction data for correcting the photographed image data of the object based on image data for foreign substance detection, wherein the image data for foreign substance detection is generated based on photographed image data generated by the image sensing device in a case that the image sensing device senses a predetermined image;
   a foreign substance removal unit configured to remove a foreign substance affixed to an optical member disposed in an image sensing light path in front of the image sensing device; and
   a control unit configured to associate the photographed image data generated by the image sensing device with the correction data created by the correction data creation unit,
   wherein in a case that the image sensing device senses an object and generates photographed image data of the object after the foreign substance removal unit performs a foreign substance removal operation, the control unit inhibits to associate the photographed image data of the object with the correction data that has been created before the foreign substance removal operation.

2. The image sensing apparatus according to claim 1, wherein the control unit invalidates the correction data that has been created before the foreign substance removal operation.

3. The image sensing apparatus according to claim 1, wherein the control unit deletes the correction data that has been created before the foreign substance removal operation.

4. The image sensing apparatus according to claim 1, further comprising:
   a count unit configured to count a number of image sensing by the image sensing device after the correction data creation unit creates the correction data; and
   a warning unit configured to alert a user to cause the correction data creation unit to create new correction data in a case that the number counted by the count unit is more than a predetermined value.

5. The image sensing apparatus according to claim 1, further comprising:
   a correction unit configured to correct photographed image data of an object using the correction data in a case that the image sensing device senses the object.

6. An image sensing apparatus, comprising:
   an image sensing device configured to sense an object and generate photographed image data of the object;
   a correction data creation unit configured to create correction data for correcting photographed image data of an object based on image data for foreign substance detection, wherein the image data for foreign substance detection is generated based on photographed image data generated by the image sensing device in a case that the image sensing device senses a predetermined image;
   a foreign substance removal mode for allowing a user to remove a foreign substance affixed to an optical member disposed in an image sensing light path in front of the image sensing device; and
   a control unit configured to associate the photographed image data generated by the image sensing device with the correction data created by the correction data creation unit,
   wherein in a case that the image sensing device senses an object and generates photographed image data of the object after the foreign substance removal mode is performed, the control unit inhibits to associate the photographed image data of the object with the correction data that has been created before the foreign substance removal mode has been performed.

7. The image sensing apparatus according to claim 6, wherein the control unit invalidates the correction data that has been created before the foreign substance removal mode has been performed.

8. The image sensing apparatus according to claim 6, wherein the control unit deletes the correction data that has been created before the foreign substance removal mode has been performed.

9. The image sensing apparatus according to claim 6, further comprising:
   a count unit configured to count a number of image sensing by the image sensing device after the correction data creation unit creates the correction data; and
   a warning unit configured to alert a user to cause the correction data creation unit to create new correction data in a case that the number counted by the count unit is more than a predetermined value.

10. The image sensing apparatus according to claim 6, further comprising:
    a correction unit configured to correct photographed image data of an object using the correction data in a case that the image sensing device senses the object.

11. An image sensing apparatus, comprising:
    an image sensing device configured to sense an object and generate photographed image data of the object;
    a correction data creation unit configured to create correction data for correcting photographed image data of an object based on image data for foreign substance detection, wherein the image data for foreign substance detection is generated based on photographed image data generated by the image sensing device in a case that the image sensing device senses a predetermined image;
    a correction unit configured to correct photographed image data of an object using the correction data;
    a foreign substance removal unit configured to remove a foreign substance affixed to an optical member disposed in an image sensing light path in front of the image sensing device; and a prohibition unit configured to prohibit correction of photographed image data of an object, using the correction data that has been created before the foreign substance removal operation, in a case where the image sensing device senses the object and generates photographed image data of the object after the foreign substance removal operation has been performed.

12. An image sensing apparatus, comprising:

an image sensing device configured to sense an object and generate photographed image data of the object;

a correction data creation unit configured to create correction data for correcting photographed image data of an object based on image data for foreign substance detection, wherein the image data for foreign substance detection is generated based on photographed image data generated by the image sensing device in a case that the image sensing device senses a predetermined image;

a correction unit configured to correct photographed image data of an object using the correction data;

a foreign substance removal mode for allowing a user to remove a foreign substance affixed to an optical member disposed in an image sensing light path in front of the image sensing device; and a prohibition unit configured to prohibit correction of photographed image data of an object, using the correction data that has been created before the foreign substance removal mode has been performed, in a case where the image sensing device senses the object and generates photographed image data of the object after the foreign substance removal mode has been performed.

* * * * *